(12) United States Patent
Bray

(10) Patent No.: US 6,867,818 B2
(45) Date of Patent: *Mar. 15, 2005

(54) AUTOMATED LANGUAGE FILTER FOR HOME TV

(75) Inventor: J. Richard Bray, Rogers, AR (US)

(73) Assignee: Principle Solutions, Inc., Rogers, AK (US)

( * ) Notice: Subject to any disclaimer, the term of this patent is extended or adjusted under 35 U.S.C. 154(b) by 748 days.

This patent is subject to a terminal disclaimer.

(21) Appl. No.: 09/748,715

(22) Filed: Dec. 21, 2000

(65) Prior Publication Data

US 2001/0034741 A1 Oct. 25, 2001

Related U.S. Application Data

(63) Continuation-in-part of application No. 08/954,950, filed on Oct. 21, 1997, now Pat. No. 6,166,780.

(51) Int. Cl.[7] .................................................. H04N 3/24
(52) U.S. Cl. ........................ 348/632; 348/633; 348/468; 704/275
(58) Field of Search ................................ 348/632, 460, 348/468, 462, 478, 482, 483, 484, 485, 906, 633, 907; 380/20; 704/275, 278; 725/28

(56) References Cited

U.S. PATENT DOCUMENTS

| | | | |
|---|---|---|---|
| 4,305,101 A | 12/1981 | Yarbrough et al. ............ 360/69 |
| 4,404,566 A | 9/1983 | Clark et al. .................... 346/1.1 |
| 4,605,973 A | 8/1986 | Von Kohorn ................ 358/335 |
| 4,739,398 A | 4/1988 | Thomas et al. ................ 358/84 |
| 4,750,213 A | 6/1988 | Novak .......................... 455/67 |
| 5,189,630 A | 2/1993 | Barstow et al. .............. 364/514 |
| 5,327,176 A | * 7/1994 | Forler et al. ................. 348/564 |
| 5,343,251 A | 8/1994 | Nafeh ......................... 348/571 |
| 5,371,795 A | 12/1994 | Vogel ........................... 380/23 |
| 5,408,273 A | 4/1995 | Okamura ..................... 348/632 |
| 5,418,621 A | 5/1995 | Park ............................ 358/335 |
| 5,434,678 A | 7/1995 | Abecassis .................... 358/342 |
| 5,446,488 A | 8/1995 | Vogel ............................. 348/3 |
| 5,485,219 A | 1/1996 | Woo ........................... 348/460 |
| 5,508,731 A | 4/1996 | Kohorn ......................... 348/1 |
| 5,555,441 A | 9/1996 | Haddad ...................... 455/4.2 |
| 5,589,945 A | 12/1996 | Abecassis ..................... 386/83 |
| 5,610,653 A | 3/1997 | Abecassis ................... 348/110 |
| 5,634,849 A | 6/1997 | Abecassis .................... 463/30 |
| 5,664,046 A | 9/1997 | Abecassis ................... 386/125 |
| 5,668,917 A | 9/1997 | Lewine ........................ 386/52 |
| 5,684,918 A | 11/1997 | Abecassis ..................... 386/83 |
| 5,692,093 A | 11/1997 | Iggulden et al. .............. 386/46 |
| 5,696,866 A | 12/1997 | Iggulden et al. .............. 386/46 |
| 5,696,869 A | 12/1997 | Abecassis .................... 386/52 |
| 5,697,844 A | 12/1997 | Von Kohorn ................ 463/40 |
| 5,713,795 A | 2/1998 | Kohorn ........................ 463/17 |
| 5,717,814 A | 2/1998 | Abecassis .................... 386/46 |
| 5,724,472 A | 3/1998 | Abecassis .................... 386/52 |
| 5,759,101 A | 6/1998 | Von Kohorn ................ 463/40 |
| 5,778,135 A | 7/1998 | Ottesen et al. ................ 386/52 |
| 5,784,522 A | 7/1998 | Yamamura ................... 386/46 |
| 5,813,010 A | 9/1998 | Kurano et al. .............. 707/100 |
| 5,828,402 A | 10/1998 | Collings ..................... 348/5.5 |
| 5,835,843 A | 11/1998 | Haddad ...................... 455/4.2 |
| 5,870,708 A | * 2/1999 | Stewart ....................... 704/275 |
| 6,166,780 A | * 12/2000 | Bray ........................... 348/632 |
| 6,181,364 B1 | * 1/2001 | Ford ............................ 725/32 |

* cited by examiner

*Primary Examiner*—Michael H. Lee
(74) *Attorney, Agent, or Firm*—Keisling Pieper & Scott PLC; Trent C. Keisling; David B. Pieper

(57) ABSTRACT

A method and apparatus for analyzing the closed caption aspect of a video signal for specific undesirable words or phrases and then muting the audio portion of those words or phrases while not effecting the video portion therein while simultaneously modifying the closed captioned signal in order to display an acceptable word or phrase.

9 Claims, 2 Drawing Sheets

AUTOMATED LANGUAGE FILTER FOR HOME TV

CROSS-REFERENCE TO RELATED APPLICATIONS

This application claims priority to U.S. patent application Ser. No. 08/954,950 filed Oct. 21, 1997 U.S. Pat. No. 6,166,780 of which it is a continuation-in-part.

FIELD OF THE INVENTION

This invention relates to a muting device used in conjunction with electronic signals such as television broadcast, signals from videocassette records, etc. More specifically, to a device which utilizes the closed caption signal which is imbedded within the video portion of a television or video signal to identify specific words or phrases. Once an undesirable word or phrase is detected, the invention would then mute the audio portion of the signal without altering the video portion of the television broadcast signal. Further, the closed caption signal is modified in that the offending word is removed from the signal. An acceptable word or phrase may then be inserted in the place of the offensive word.

BACKGROUND OF THE INVENTION

Television communications over the years has become an everyday part of existence in the United States and abroad. These communications include a wide range of words and phrases. Some of the viewers of these communications would prefer that some specific words or phrases not be utilized. Viewers of these programs would like to view these programs but without having to be exposed to undesirable words or phrases. In order to meet this need, the viewing audience needs a means for automatically identifying specific words and/or related phrases and muting such words or phrases without affecting the video portion of the television or video signal.

Prior art for automatic program recognition and modification follows two different paths. The first path discloses methods of identifying and subsequent blocking out of video signals. U.S. Pat. No. 5,484,518 by Hunter, et al., discloses a method and apparatus for the recognition of electronic television broadcast programming and for a choice among available programs. It allows the user to lock out or block out all programs that have not been determined to be suitable to be viewed by all family members. These types of parental control devices work off principles of the time and codes. The devices block a television signal, both video and audio portions, during specific time frames and which have specific rating pursuant to an established rating code. This type of device does not allow the viewer to view the program.

The other line of prior art relates to the splitting of the audio and video portions of the television broadcast signal. U.S. Pat. No. 5,408,273 for Okamura discloses a circuit which allows the closed captioned data contained within the video portion of the television signal to be displayed whenever the muting function of the audio portion of the signal has been activated (see also U.S. Pat. No. 5,327,716 for Foyler, et al.). This device focuses on displaying the closed captioned data when the audio portion of a signal is muted. This device is an aid when the viewer manually activates the muting function of a television set. It does not act as a monitor of the content of the video portion of the television signal.

The ability to choose what is appropriate for the family is becoming more and more important. Prior art discloses either a method of blocking out an entire program and thus missing important information or by manually muting the audio portion and displaying the closed captioned text, the closed-captioned data would still include, and thus display specific undesired information on the screen. There is a need in which to mute specific words or phrases while at the same time not effecting the video portion of the signal while displaying a modified closed caption signal.

SUMMARY OF THE INVENTION

The present invention is directed to a method and apparatus for processing a television or video signal in which the closed-captioned data contained within the video portion of the signal is analyzed for specific words or phrases. The present invention then mutes those words or phrases from the audio signal while not effecting the corresponding video portion of the signal. The device will then strip the identified word or phrase from the closed captioned signal, and it may replace it with another word or phrase. The modified closed caption segment may or may not be displayed depending on the devices settings. The mute is disabled when the closed caption command code to erase the modified closed captioned segment is received.

The present invention provides a variety of advantages over the prior art. One object of the invention is to allow parental control over the content of the television signals without necessarily blocking the video portion of the signal. The prior art discloses methods for simultaneously preventing both video and audio portions of a television signal from being heard or viewed. The present invention is able to analyze the closed captioned signal of the video portion of either a television or video signal for undesirable words or phrases. Once a word or phrase is detected, the invention is able to mute the audio portion of the signal without affecting the video signal. Thus, allowing the viewer to see the video portion of the signal but not hear the undesirable audio portion.

Another object of the invention is to mute unacceptable words or phrases at the time of a broadcast of a television signal or at the time when a signal has been received from a storage device such as a video cassette recorder. The processing time in which to analyze the closed caption portion of the video signal is minimal. Thus, the muting affect will occur at or near the time in which the video portion of the signal is displayed on the receiver's screen.

Another object of the invention is to provide a device which operates on technology which is currently available. The invention is based on the closed caption data which is embedded into the video portion of television and video signals. Most of the signals transmitted either via the television broadcast networks or other video players embed closed caption data. By utilizing closed caption data, the present invention is able to operate without having the need to develop new standards or devices.

Another object of the invention to provide the user with options regarding the level of tolerance regarding the amount of words or phrases which will be subject to the muting aspect of the invention. To some users, a specific word is not offensive while at the same time, that word is considered to be unacceptable. By providing a means for selecting different levels of tolerance, the present invention allows users to utilize the invention pursuant to own personal desires.

Another object of the invention is to provide the user with option regarding the levels of displaying the modified closed captioned data. The present invention allows the viewer the option of seeing the entire modified and unmodified closed caption text, seeing only the modified closed captioned text during mute, or not seeing any closed captioned text at all.

DETAILED DESCRIPTION OF THE EMBODIMENT

Figure 1:
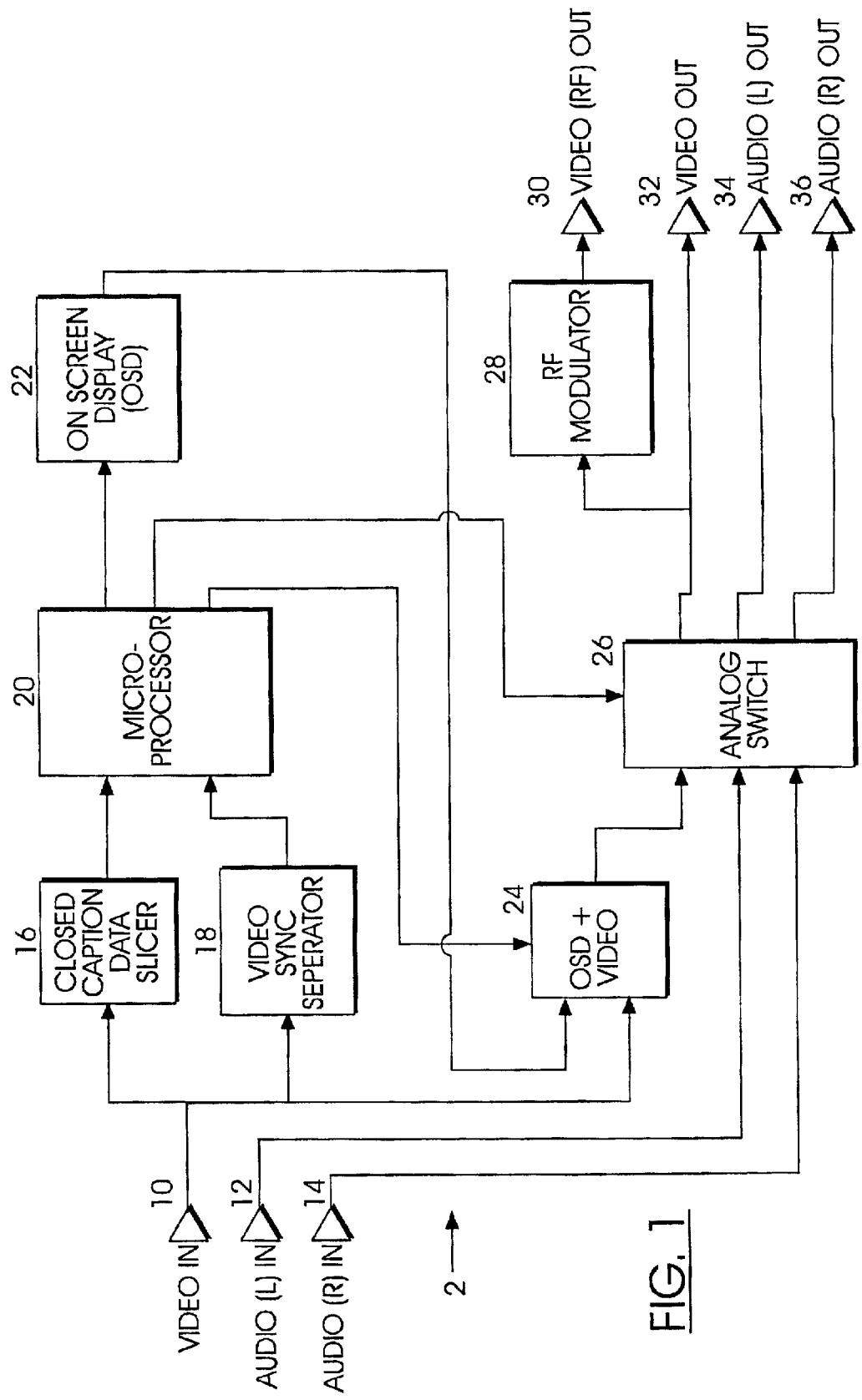
FIG. 1 is a block diagram of the automatic language filter in accordance with the embodiments of the present invention.

Referring to FIG. 1, the automatic language filter 2 in accordance with the embodiments comprises a video input 10, an audio (Left) input 12, an audio (Right) input 14, a closed-captioned data slicer 16, a video-sync separator 18, a micro-processor 20, an on-screen display (OSD) 22, an OSD+Video 24, an analog switch 26, an RF modulator 28, a video (RF) out 30, a video out 32, an audio (Left) out 34, and an audio (Right) out 36.

When a video portion of the television signal is received in video input 10 the closed-captioned data contained therein is extracted and separated from the video feed by closed-caption data slicer 16. That information is then analyzed to see if inappropriate words or phrases are contained therein by microprocessor 20. This analysis is performed by comparing the closed caption data against a library of words and phrases stored within the microprocessor's memory. If any word or phrase is determined to be inappropriate a signal is sent to analog switch 26 to mute the audio portion of the signal as received in audio (Left) input 12 and audio (Right) input 14.

After a word or phrase is determined to be inappropriate, the microprocessor then strips the offensive word or phrase from the closed caption data. A replacement word or phrase is then inserted into the closed caption data.

On-screen display (OSD) 22 responds to signals received from microprocessor 20. OSD+Video 24 then superimposes the signals from OSD 22 upon the video signal received from microprocessor 20. The audio and video portions of the signal are then available to the viewer by the means of video (RF) out 30, video out 32, audio (Left) 34, and audio (Right) out 36.

Figure 2:
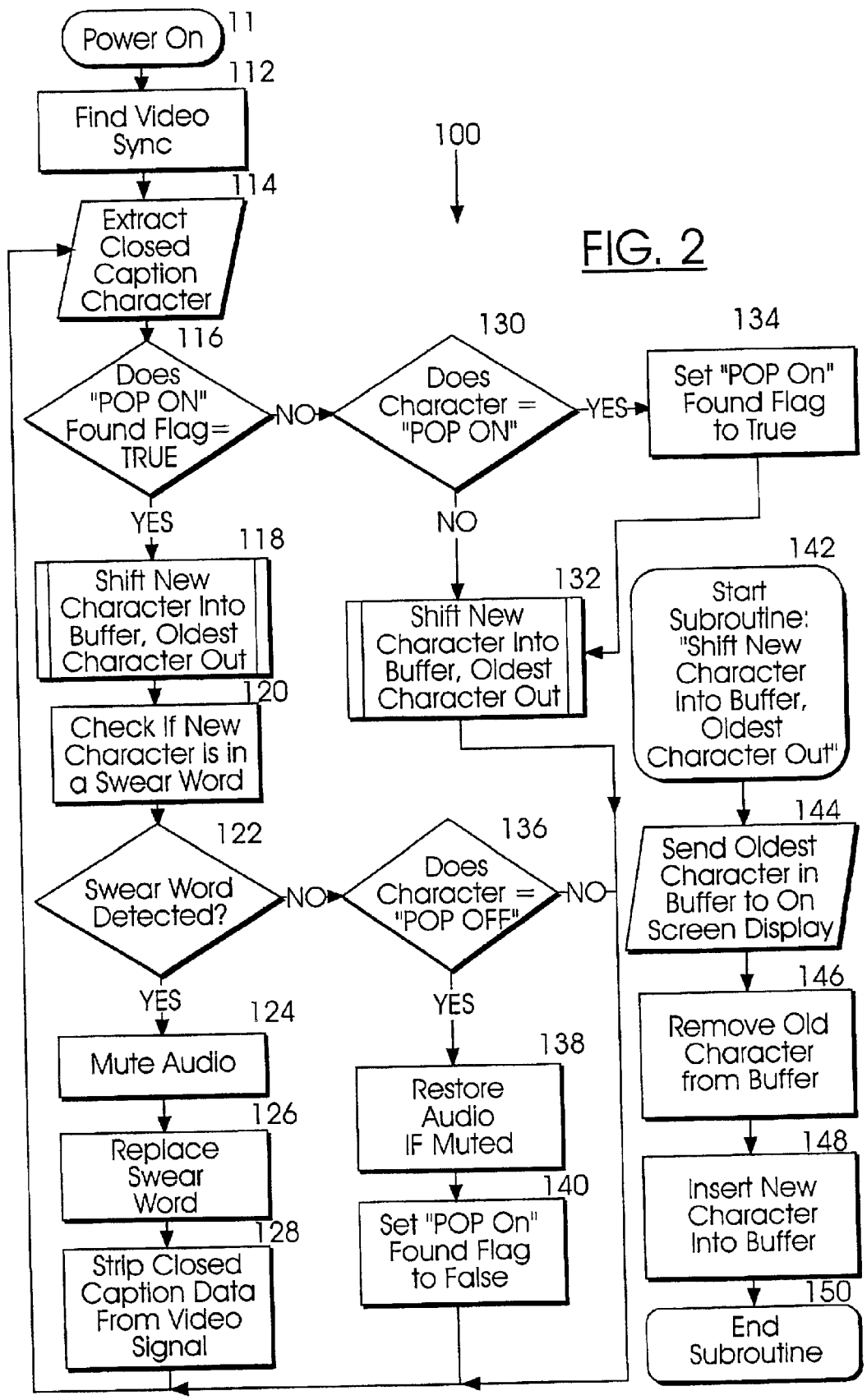
FIG. 2 is a flow diagram of the automatic language filter in accordance with the embodiments of the present invention.

The above described functions of microprocessor 20 can be performed under appropriate software control. FIG. 2 shows a flowchart illustrating an approach to the microprocessor 20 analysis of the signal as received by video in 10. The microprocessor 20 enters the routine at step 112. The closed caption data is extracted at step 114 by closed captioned data slicer 16. This data is in the form of a pair of characters. Microprocessor 20 looks for the specific code POP-ON within these characters. If the code POP-ON is detected, microprocessor compares the specific closed caption data with a list of undesirable words or phrases at step 122. If an undesirable word or phrase is detected, a command is sent from microprocessor 20 to analog switch 26 to mute audio portion of the signal at step 124. Microprocessor 20 then replaced the undesirable word or phrase with a more acceptable one at step 126. The closed caption data is then striped from the video signal by microprocessor 20 at step 128. The routine is then reset awaiting the next set of extracted closed captioned characters.

What is claimed is:

1. An apparatus for processing an electronic signal including video and audio portions corresponding to audible and visible portions of the electronic signal, with said audio portion containing a spoken component related to the audible portion and with said video portion containing an auxiliary information component corresponding to a visible representation of said spoken component of said electronic signal comprising:

a video input means to receive video portion of an electronic signal with video portion containing an auxiliary information component, an audio input means to receive audio portion of an electronic signal with said audio portion corresponding to said video portion, a video output means by which the video portion of the electronic signal is made available to a user of the apparatus, an audio output means by which the audio portion of the electronic signal is made available to a user of the apparatus, means for separating said an auxiliary information component from said video portion, means for analyzing said auxiliary information component in order to determine if said auxiliary information component contains specific words or phrases, and means for, muting corresponding audio portion of said electronic signal if specific words or phrases are detected within said auxiliary information component, removing or replacing any detected specific word or phrase with another word or phrase found within said auxiliary information component of the video portion, disabling mute at the conclusion of receipt of the modified auxiliary information component, means to synchronize said modified video portion with audio portion, and means to transmit said synchronized signal to said video output and audio output.

2. The apparatus of claim 1, wherein said auxiliary information component is a closed caption signal.

3. The apparatus of claim 1, wherein said electronic signal is a television signal.

4. The apparatus of claim 1, wherein said electronic signal is a signal received from a storage device such as a video cassette recorder.

5. The apparatus of claim 1, further comprising:

means for selecting different levels of operation with respect to the muting of specific words or phrases, with said different levels include:
- a very tolerant level in which no word or phrase will be muted,
- a medium tolerant level in which a select amount of words or phrases will be muted,
- a strict level in which the list of specific words or phrases in an amount greater than the medium tolerant level will be muted.

6. The apparatus of claim 1, further comprising:

means for displaying of said modified and/or unmodified auxiliary information component at the time the specific word or phrase is replaced.

7. The apparatus of claim 6, further comprising:

means for selecting different levels of operation with respect to the displaying of said modified auxiliary information component, with said different levels include:
- a full captioning level in which all modified or unmodified auxiliary information data is displayed,
- a normal captioning level in which only modified words or phrases which represent the replacement words or phrases are displayed,
- a no captioning level in which no word or phrase is displayed.

8. The apparatus of claim 6, wherein said auxiliary information component is a closed caption signal.

9. The apparatus of claim 7, wherein said auxiliary information component is a closed caption signal.

* * * * *